(12) United States Patent
Salter et al.

(10) Patent No.: US 12,338,674 B2
(45) Date of Patent: Jun. 24, 2025

(54) DUAL WINDOW SYSTEM WITH PRIVACY PANEL

(71) Applicant: Ford Global Technologies, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US); Michael John Harmon, Northville, MI (US); Jesse Rene Diephuis, West Bloomfield, MI (US); David Brian Glickman, Southfield, MI (US); Clayton Benjamin Ford, Dearborn, MI (US); Hussain Z Tajmahal, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/832,835

(22) Filed: Jun. 6, 2022

(65) Prior Publication Data

US 2023/0392430 A1 Dec. 7, 2023

(51) Int. Cl.
*E05F 17/00* (2006.01)
*B60J 1/20* (2006.01)
*E05F 15/695* (2015.01)

(52) U.S. Cl.
CPC ........... *E05F 17/002* (2013.01); *B60J 1/2011* (2013.01); *E05F 15/695* (2015.01);
(Continued)

(58) Field of Classification Search
CPC ........ E05F 17/002; B60J 1/16–17; B60J 1/20; B60J 1/12; B60J 1/2069; E05Y 2201/434; E05Y 2201/654; E05Y 2201/668; E05Y 2201/684; E05Y 2201/694; E05Y 2400/40; E05Y 2400/45; E05Y 2400/85; E05Y 2900/55
See application file for complete search history.

(56) References Cited

U.S. PATENT DOCUMENTS 4,331,359 A * 5/1982 Sheldon ................. F41H 5/263
49/63
4,930,255 A * 6/1990 Sea ....................... E05F 15/689
49/63

(Continued)

FOREIGN PATENT DOCUMENTS

CN 101414065 A 4/2009
CN 111376684 A 7/2020
(Continued)

*Primary Examiner* — Daniel P Cahn
*Assistant Examiner* — Patrick B. Ponciano
(74) *Attorney, Agent, or Firm* — Vichit Chea; Carlson, Gaskey & Olds, P.C.

(57) ABSTRACT

A system includes a first panel and a second panel. The first panel is configured to be movably mounted within a vehicle structure to move between an open position and a closed position. The second panel is moveable independently of the first panel within the vehicle structure by a drive mechanism between a deployed position and a non-deployed position. The second panel is automatically or selectively moved to the deployed position to provide a privacy mode within a passenger compartment.

29 Claims, 10 Drawing Sheets

(52) U.S. Cl.
CPC ..... *E05Y 2201/434* (2013.01); *E05Y 2201/64* (2013.01); *E05Y 2201/654* (2013.01); *E05Y 2201/668* (2013.01); *E05Y 2201/684* (2013.01); *E05Y 2201/694* (2013.01); *E05Y 2400/40* (2013.01); *E05Y 2400/45* (2013.01); *E05Y 2400/85* (2013.01); *E05Y 2900/55* (2013.01)

(56) References Cited

U.S. PATENT DOCUMENTS

| | | | |
|---|---|---|---|
| 5,165,188 A * | 11/1992 | Tsiros | B60J 3/02 49/63 |
| 7,806,461 B2 * | 10/2010 | Patterson | B60J 1/2011 49/63 |
| 8,213,074 B1 | 7/2012 | Shrivastava et al. | |
| 8,556,328 B1 * | 10/2013 | Middleton | B60J 1/2047 296/97.8 |
| 8,844,196 B2 * | 9/2014 | Park | E05F 15/689 49/63 |
| 8,915,021 B2 * | 12/2014 | Han | E05F 15/689 49/63 |
| 10,030,431 B2 * | 7/2018 | Elie | E05F 15/614 |
| 10,343,500 B2 * | 7/2019 | Chander | B60J 1/17 |
| 10,422,177 B2 * | 9/2019 | Suzuki | E05F 15/689 |
| 10,843,535 B1 | 11/2020 | Mazuir et al. | |
| 10,935,818 B2 | 3/2021 | Lam et al. | |
| 12,280,639 B2 * | 4/2025 | Schmid | B60J 1/2044 |
| 2003/0019591 A1 * | 1/2003 | Christian | B60J 1/2011 160/89 |
| 2003/0025354 A1 * | 2/2003 | Akintan | B60J 1/17 49/63 |
| 2008/0231934 A1 * | 9/2008 | Knafou | B60J 3/04 359/290 |
| 2014/0077520 A1 | 3/2014 | McManus | |
| 2014/0231033 A1 * | 8/2014 | Han | E05F 15/689 160/310 |
| 2014/0303788 A1 | 10/2014 | Sanders et al. | |
| 2014/0375083 A1 * | 12/2014 | Tejeda | B60J 7/043 49/404 |
| 2017/0136854 A1 * | 5/2017 | Dunne | B60J 1/2088 |
| 2018/0137470 A1 | 5/2018 | Donnelly et al. | |
| 2019/0270284 A1 | 9/2019 | Couillard et al. | |
| 2020/0024884 A1 * | 1/2020 | Inskeep | G06T 7/70 |
| 2021/0132458 A1 | 5/2021 | Trikha et al. | |
| 2021/0139031 A1 * | 5/2021 | Zass | B60W 30/18 |

FOREIGN PATENT DOCUMENTS

| | | | | |
|---|---|---|---|---|
| JP | 2017061252 A | | 3/2017 | |
| WO | WO-2006042761 A1 | * | 4/2006 | ............ B60J 1/2025 |
| WO | WO-2017071911 A1 | * | 5/2017 | ....... B32B 17/10495 |

* cited by examiner

DUAL WINDOW SYSTEM WITH PRIVACY PANEL

TECHNICAL FIELD

This disclosure relates generally to a dual pane window system and, more particularly, to a dual pane window system that is used to provide a privacy mode within a vehicle.

BACKGROUND

Vehicle interiors are being used in more versatile ways, such as for mobile offices, conference rooms, and rest and relaxation areas, for example. There is a need for increased privacy in order to make the most effective use of this interior space.

SUMMARY

In some aspects, the techniques described herein relate to a system, including: a first panel configured to be movably mounted within a vehicle structure to move between an open position and a closed position; and a second panel moveable independently of the first panel within the vehicle structure by a drive mechanism between a deployed position and a non-deployed position, wherein the second panel automatically or selectively moves to the deployed position to provide a privacy mode within a passenger compartment.

In some aspects, the techniques described herein relate to a system, wherein the first panel is non-opaque and the second panel is opaque.

In some aspects, the techniques described herein relate to a system, wherein the first panel comprises a glass window and the second panel is comprised of a polycarbonate or metal material.

In some aspects, the techniques described herein relate to a system, wherein the second panel has an exterior surface with a pattern and/or a logo.

In some aspects, the techniques described herein relate to a system, wherein the second panel has an exterior surface that comprises a one-way mirror.

In some aspects, the techniques described herein relate to a system, wherein the second panel has an exterior surface that matches a body color of a vehicle that provides the passenger compartment.

In some aspects, the techniques described herein relate to a system, wherein the drive mechanism is a scissor system driven by a motor.

In some aspects, the techniques described herein relate to a system, wherein the drive mechanism is a pulley system driven by motor.

In some aspects, the techniques described herein relate to a system, wherein the vehicle structure comprises a window frame structure and including a center spine held fixed within the window frame structure, and wherein the center spine includes a first track formed on one side that slidably receives the first panel and a second track formed on an opposite side that slidably receives the second panel.

In some aspects, the techniques described herein relate to a system, wherein the first panel includes a first cartridge that slides within the first track and the second panel includes a second cartridge that slides within the second track, and including a first set of pulleys driven by the motor to move the first panel and a second set of pulleys driven by the motor such that the first and second panels can move independently of each other.

In some aspects, the techniques described herein relate to a system, wherein the first and second sets of pulleys include a common drive pulley, and including a clutch having a first clutch member associated with the drive pulley and a second clutch member that is associated with the second panel such that, when the first and second clutch members are engaged with each other, the first and second panels can move together as a unit.

In some aspects, the techniques described herein relate to a system that includes a control system to control the drive mechanism to selectively or automatically move the second panel to the deployed position in response to at least one of a plurality of activation conditions.

In some aspects, the techniques described herein relate to a system, wherein the plurality of activation conditions comprise at least an office mode, a conference mode, a rest mode, or a conversation mode In some aspects, the techniques described herein relate to a system, wherein the control system is activated using at least one of a voice command, a smart device, or a vehicle console with a touch display or tactile button/toggle interface.

In some aspects, the techniques described herein relate to a system, wherein, when the second panel is in the deployed position, one or more exterior sensors are used to alert an occupant in the passenger compartment that an external person or object is approaching the passenger compartment.

In some aspects, the techniques described herein relate to a system, wherein exterior and interior sound exciters are used to create an intercom such that an occupant within the passenger compartment can communicate with someone external to the passenger compartment.

In some aspects, the techniques described herein relate to a system, wherein the plurality of activation conditions comprise at least a changing room condition, and including at least one interior sensor that is used to recognize the changing room condition and initiate the controller to move the second panel to the deployed condition.

In some aspects, the techniques described herein relate to a system, wherein the plurality of activation conditions comprise a security mode that is automatically activated once a vehicle with the first and second panels is parked and unoccupied.

In some aspects, the techniques described herein relate to a method, including the steps of: mounting a first panel within a vehicle door structure to move between an open position and a closed position; mounting a second panel within the vehicle door structure to move independently of the first panel between a deployed position and a non-deployed position; and automatically or selectively moving the second panel to the deployed position to provide a privacy mode within a passenger compartment.

In some aspects, the techniques described herein relate to a method, wherein: the first panel is non-opaque and the second panel is opaque, and/or the first panel comprises a glass window and the second panel is comprised of a polycarbonate or metal material; and including coupling a pulley system or a scissor system to independently move the first and second panels using a drive motor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a dual pane window system for a vehicle that is used to provide a privacy mode within a vehicle.

Figure 1A:
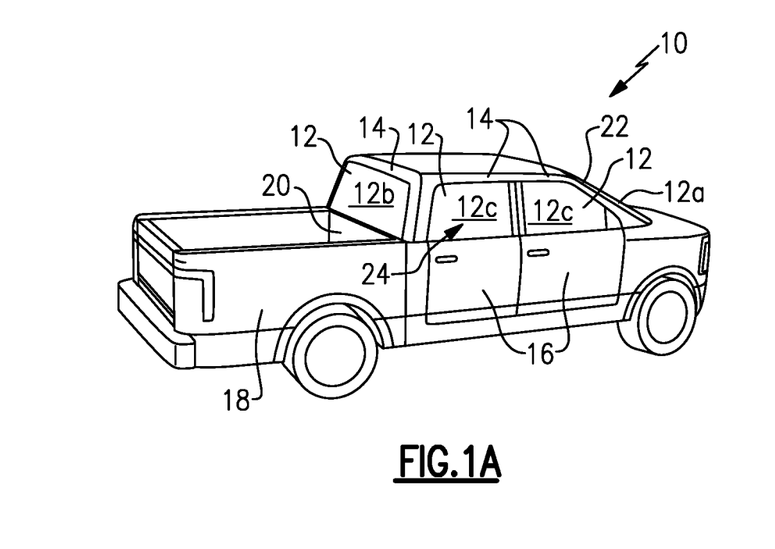
FIG. 1A illustrates a vehicle with a standard window configuration such that an interior of the vehicle can be viewed from outside the vehicle.
Figure 1B:
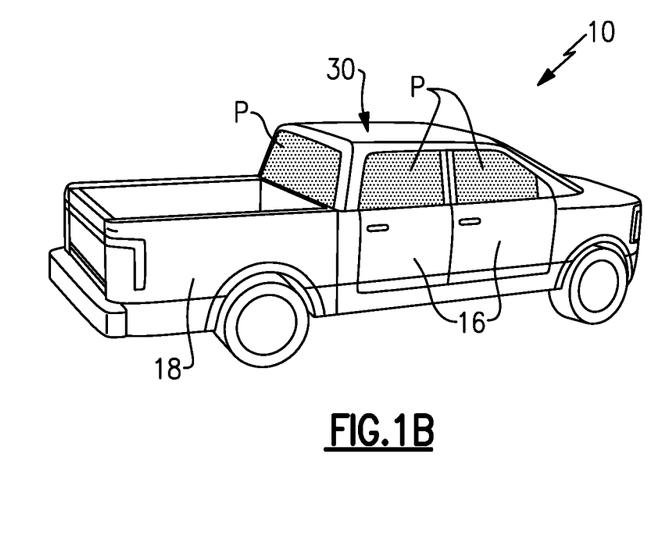
FIG. 1B illustrates the vehicle of FIG. 1A with a privacy window configuration such that an interior of the vehicle cannot be viewed from outside the vehicle.

With reference to FIG. 1A, a vehicle 10 includes a plurality of windows 12 that are mounted within window frame structures 14. Some of the window frame structures 14 are associated with moveable vehicle doors 16, while other window frame structures are found in vehicle side panels 18, rear panels 20, or front windshield support structures 22. In one example, the vehicle 10 includes a passenger compartment 24 that is enclosed by a front window 12a, a rear window 12b, and a plurality of vehicle doors 16 with door windows 12c. As the industry moves toward electric and autonomous vehicles, passenger compartments 24 are being used in more versatile ways, such as for mobile offices, conference rooms, and rest and relaxation areas, for example. There is a need for increased privacy in order to make the most effective use of this interior space. The subject disclosure provides a dual pane window system 30 that is used to provide this needed privacy by activation of a privacy condition P such that the interior of the vehicle 10 cannot be seen from the outside as shown in FIG. 1B. It should be appreciated that the vehicle 10 may be locked-out in park and not moving when the dual pane window system 30 is deployed for privacy uses. It is anticipated that technology and the regulatory framework may evolve in the future to where using the dual pane window system 30 in a moving vehicle becomes safe and permissible.

Figure 2A:
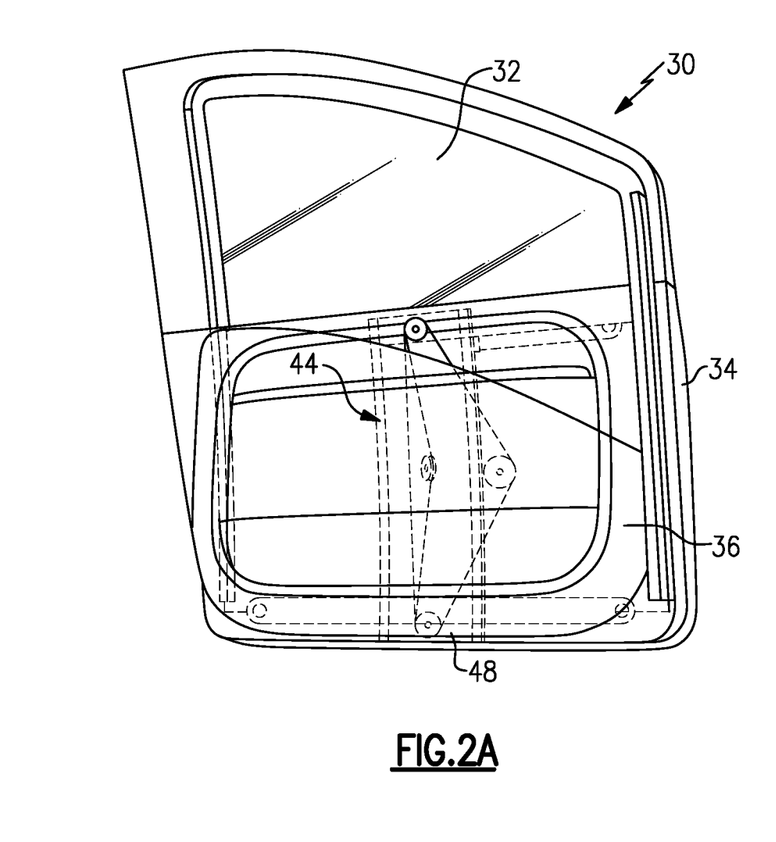
FIG. 2A is an interior view of a dual pane window and mechanical drive system.
Figure 2B:
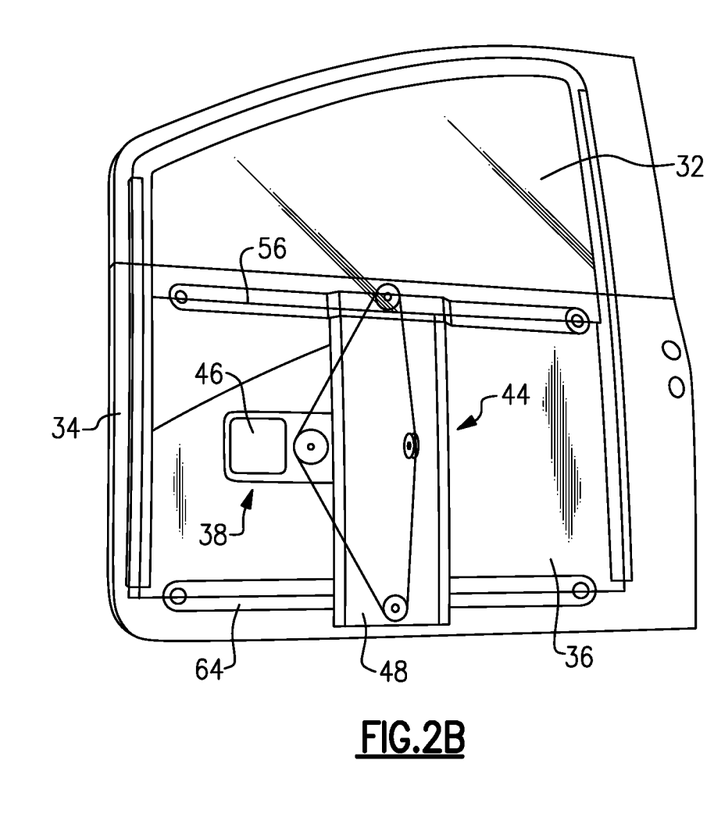
FIG. 2B is an exterior view of the dual pane window and mechanical drive system of FIG. 2A.

In one example shown in FIGS. 2A and 2B, the dual pane window system 30 includes a first panel 32 that is movably mounted within a vehicle structure 34 and a second panel 36 that is movably mounted within the vehicle structure 34. The first panel 32 moves between an open position and a closed position. The second panel 36 is moveable independently of the first panel 32 within the vehicle structure 34 between a deployed position and a non-deployed position. The first 32 and second 36 panels are moved using a common drive mechanism 38. The second panel 36 can be automatically or selectively moved to the deployed position to provide a privacy mode within the passenger compartment 24. This movement can be actively activated/deactivated by an occupant or user, or can be automatically activated/deactivated in response to one or more different operational situations. This will be discussed in greater detail below.

In one example, the first panel 32 is non-opaque and the second panel 36 is opaque. This allows the first panel 32 to serve as a standard window such that light is transmitted into the passenger compartment and occupants and objects within the vehicle interior can be seen from outside the vehicle 10 (FIG. 1A). This standard window is moved between an open position where access to the interior is not blocked and a closed position positioned where access into the interior is blocked. The opaque second panel 36 serves to block light from being transmitted through the panel 36 such that occupants and objects within the vehicle interior cannot be seen from outside the vehicle 10 (FIG. 1B).

Figure 3A:
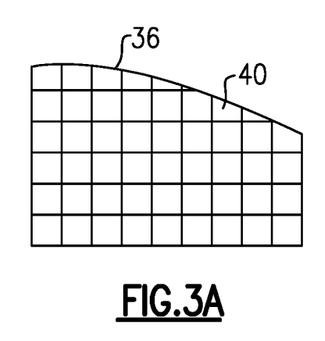
FIG. 3A is a privacy panel showing a textured or pattern configuration.
Figure 3B:
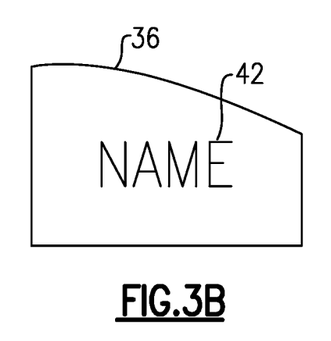
FIG. 3B is a privacy panel showing a logo or branding configuration.

In one example, the first panel 32 comprises a glass window and the second panel 36 is comprised of a polycarbonate or metal material such as aluminum, for example. This more robust second panel 36 provides additional benefits than just increased privacy. The use of a second panel 36 formed from such a material acts as a theft deterrent as it makes it more difficult to break through the window to grab or take items from within the vehicle. Additionally, the second panel 36 can be provided with an exterior surface that has a decorative pattern 40 (FIG. 3A) and/or a brand or logo 42 (FIG. 3B). The second panel 36 could also be configured to act as a one-way mirror. For a polycarbonate security window, the second panel could be partial vac-metalized on the inner surface to achieve the one way mirror effect. This allows the second panel 36 to reflect sunlight, keeping the passenger compartment 24 cooler. Additionally, this can be used to save battery usage to actively cool the vehicle and extend the range of an electric or hybrid vehicle. In another example, the second panel 36 can be colored as a blackout surface or the exterior surface of the second panel 36 can be colored to match a body color of the vehicle.

Additionally, each window 12 on the vehicle could have its own dual pane window 30 and drive mechanism 38 such that the second panels 36 can be independently deployed. For example, if one side of the vehicle 10 is facing the sun, the privacy panels could be raised on that side while keeping the opposite side open for viewing externally.

The drive mechanism 38 comprises a mechanical system that is driven by a motor 46 (FIG. 2B). In one example, the motor 46 is the same window motor that would be traditionally used to raise and lower window glass in a single pane system. The drive mechanism 38 could be a scissor system or a pulley/cable system driven by the motor 46. FIGS. 2A-2B and FIGS. 4-5 show an example of a pulley system 44 that is driven by a motor 46. FIG. 2A shows an interior view and FIG. 2B shows an exterior view. A center spine 48 is held fixed within the vehicle frame structure 34. In one example, the center spine 48 is centrally located within the door or panel frame structure 34 and has a vertical height that is greater than a horizontal or longitudinal width. The door or panel frame structure 34 provides a pocket or recessed area that receives the first 32 and second 36 panels when the panels are in the lowered, open, or non-deployed position. This pocket/recessed area also houses and protects the drive mechanism 38. On a door inner side the faces the passenger compartment, the door would be covered with upholstery and/or trim.

Figure 4:
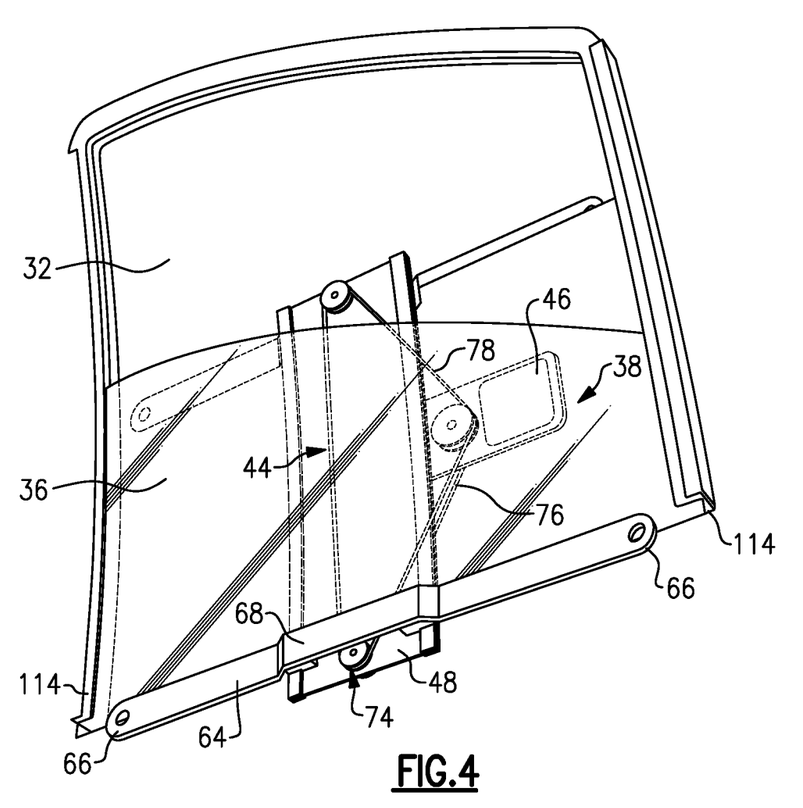
FIG. 4 is an interior perspective view of the dual pane window and mechanical drive system with a first, standard panel raised and a second, privacy panel lowered.
Figure 5:
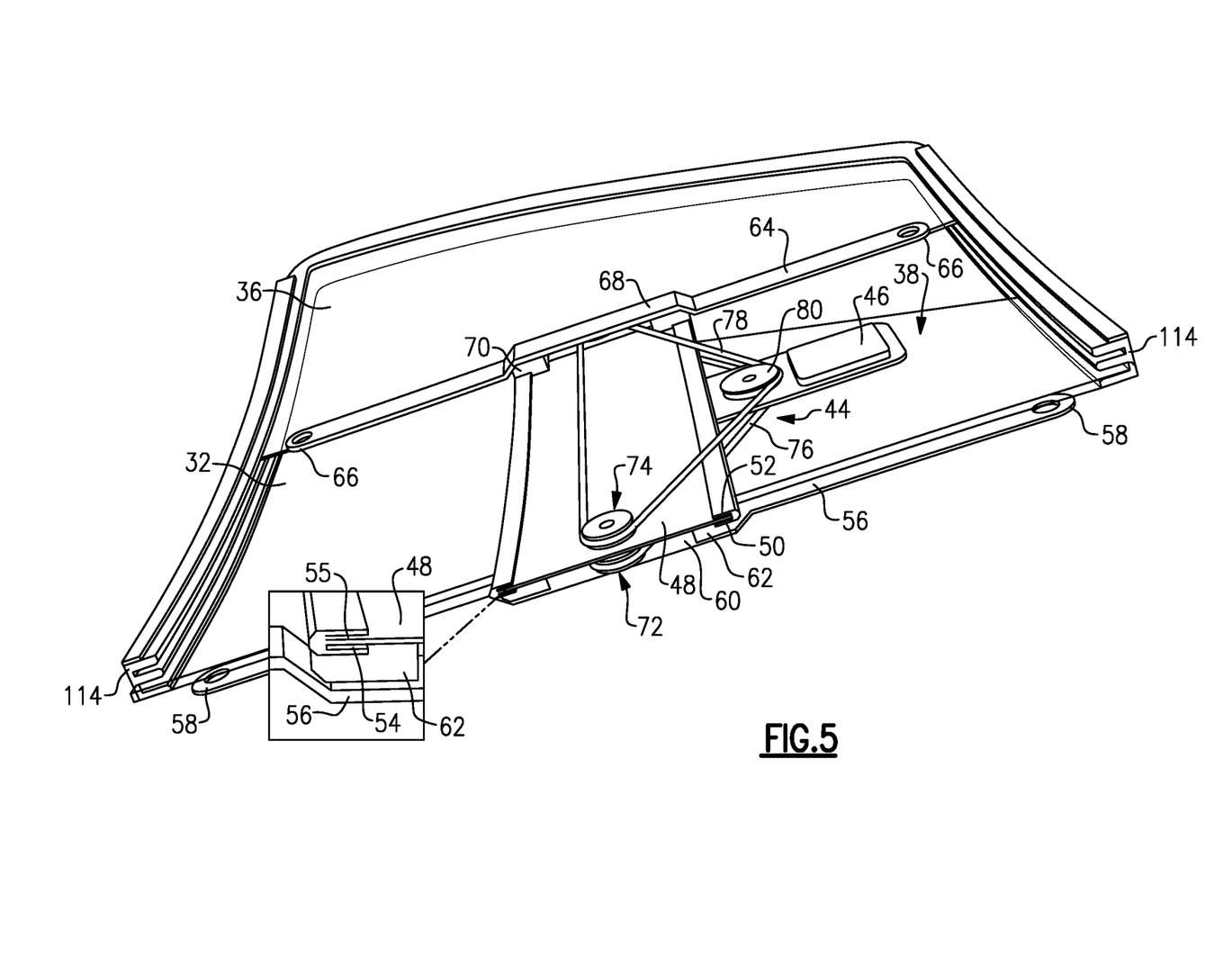
FIG. 5 is an interior perspective view of the dual pane window and mechanical drive system with the second panel raised and the first panel lowered.

As shown in FIGS. 4-5, the center spine 48 includes a first track 50 formed on one side that slidably receives the first panel 32 and a second track 52 formed on an opposite side that slidably receives the second panel 36. The first track 50 comprises a pair of guide rails that provide grooves or slots 54 along opposing horizontal or longitudinally spaced edges of the center spine 48 on the one side. The second track 52 comprises a pair of guide rails that provide grooves or slots 55 along opposing horizontal or longitudinally spaced edges of the center spine 48 on the opposite side.

In one example, the first panel 32 includes a first support/mounting bar 56 that extends along a lower edge of the first panel 32. The first bar 56 has opposing ends 58 that are mounted to the first panel 32 and a portion 60 that is spaced from the first panel 32 to provide an open area between the first bar 56 and the first panel 32. In one example, a first cartridge 62 is mounted to the bar 56 within this open area such that that first cartridge 62 slides along the first track 50. In one example, the opposing ends 58 of the first bar 56 are coplanar with each other, and the portion 60 of the bar with the open area extends outwardly and is non-coplanar with the ends 58. The portion 60 can comprise a C-shape or U-shape profile, for example.

In one example, the second panel 36 includes a second support/mounting bar 64 that extends along a lower edge of the second panel 36. The second bar 64 has opposing ends 66 that are mounted to the second panel 36 and a portion 68 that is spaced from the second panel 36 to provide an open area between the second bar 64 and the second panel 36. In one example, a second cartridge 70 is mounted to the bar 64 within this open area such that that second cartridge 70 slides along the second track 52. In one example, the opposing ends 66 of the second bar 64 are coplanar with each other, and the portion 68 of the bar 64 with the open area extends outwardly and is non-coplanar with the ends 66. The portion 68 can comprise a C-shape or U-shape profile, for example.

In one example, a cable system includes a first set of pulleys 72 that are driven by the motor 46 to move the first panel 32 and a second set of pulleys 74 that are driven by the motor 46 such that the first 32 and second 36 panels can move independently of each other. A first cable 76 is associated with the first set of pulleys 72 and a second cable 78 is associated with the second set of pulleys 74. The first 72 and second 74 sets of pulleys include a common drive pulley 80. The cable system relies on the motor 46 that turns a pulley which imparts a tension on the cable 76 and/or 78 and translates the rotational movement to linear displacement of the window 32 and privacy panel 36. The same motor 46 can drive the second pulley, which can be attached to the privacy panel 36 or a separate bracket mounted to the window/first panel 32. The cable system can either act to engage a clutch 82 and drive the privacy panel 36 when the range of motion of the window 32 is completed, or on demand independent of the position of the window 32.

In one example, the clutch 82 (FIGS. 6A-6B) is used to couple the second panel 36 to the first panel to move the panels to the closed/deployed position. The cutch 82 has a first clutch member 84 associated with the drive pulley 80 and a second clutch member 86 that is associated with the second panel 36. When the first 84 and second 86 clutch members are engaged with each other, the first 32 and second 36 panels can move together as a unit. In one example, the first clutch member 84 has recesses/protrusions that mate with corresponding protrusions/recess on the second clutch member 86 such that when engaged, the first 84 and second 86 clutch members rotate together as a unit with the drive pulley 80. Other types of clutch mechanisms could also be used such as spring driven or magnetic where there is engagement or disengagement such that one mode drives the main (window) cable 76 and the other mode drives the privacy panel 36, all with the same motion of the motor 46.

Figure 6A:
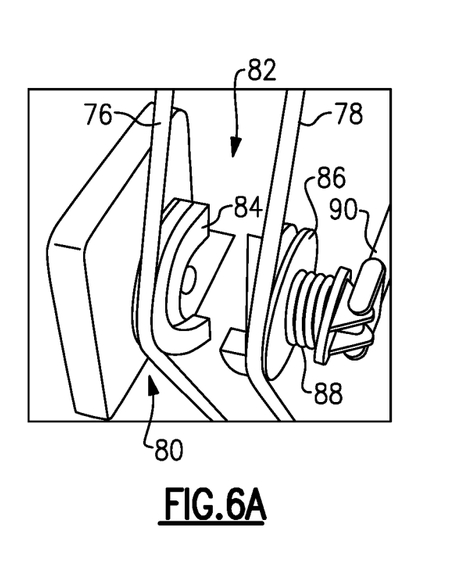
FIG. 6A is a perspective view of a clutch in a disengaged position.
Figure 6B:
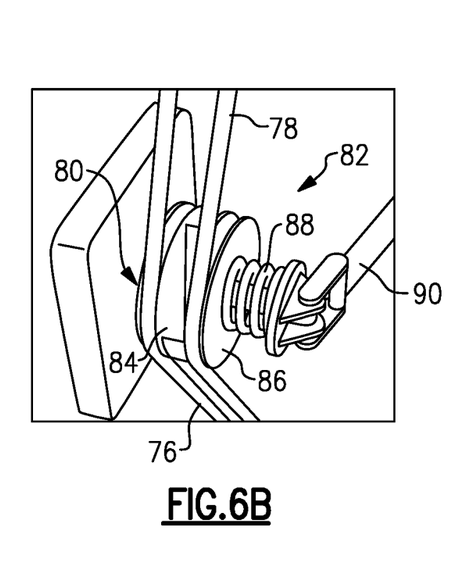
FIG. 6B is a perspective view of a clutch in an engaged position.

In one example, a spring 88 biases the second clutch member 86 to the engaged position. When the spring force is overcome, the second clutch member 86 is released from the first clutch member 84 such that the first panel 32 can be moved without moving the second panel 36. The spring 88 is coupled to an arm 90 that is associated with the second panel 36.

In one example, a control system 92 (FIG. 7) is used to control the motor 46 of the drive mechanism 38 to selectively or automatically move the second panel 36 to the deployed position in response to at least one of a plurality of activation conditions. The control system 92 is also used to control the clutch 82 via engagement of the clutch members 84, 86. The control system 92 includes a controller 94 with a processor, memory, and one or more input and/or output (I/O) device interface(s) that are communicatively coupled via a local interface. The local interface can include, for example but not limited to, one or more buses and/or other wired or wireless connections. The controller 94 may be a hardware device for executing software, particularly software stored in memory. The software in the memory may include one or more separate programs, each of which includes an ordered listing of executable instructions for implementing logical functions. The Input/Output devices may be coupled to system Input/Output interface(s) or may be in communication with system interfaces. Such devices can include sensors, touch screens, keypads/input buttons or toggles, smart devices, microphones, cameras, proximity devices, radar, sonar, etc.

Figure 7:
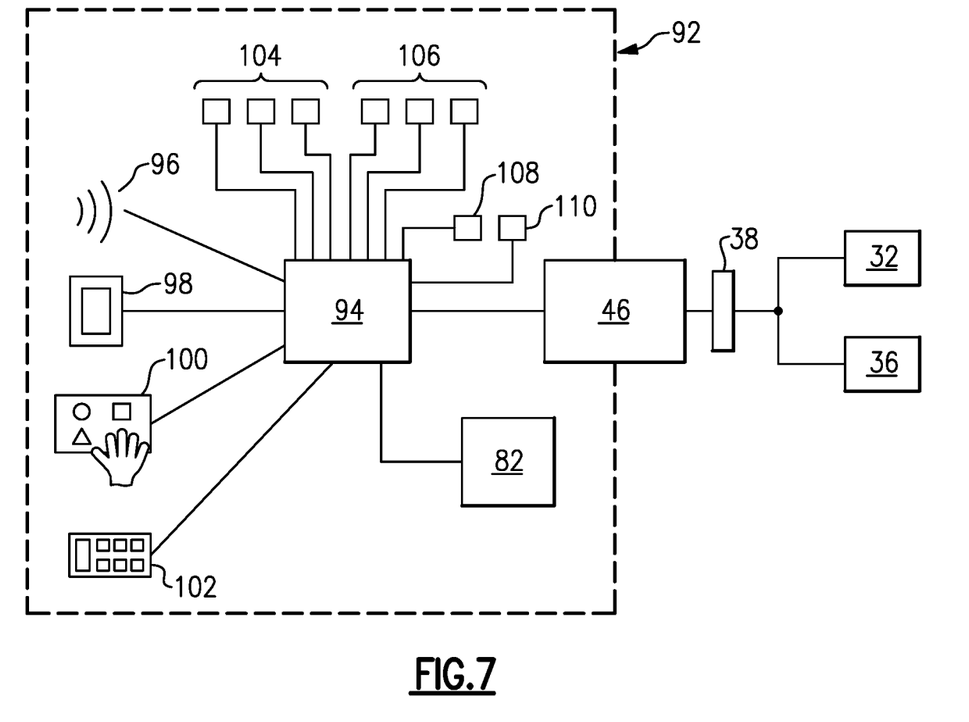
FIG. 7 is a schematic representation of a control system for the dual pane window and mechanical drive system.

When a privacy mode is desired, e.g., at least one of a plurality of activation conditions occurs, the controller 94 actuates the motor 46 and engages the clutch 82 to move the second panel 36 to the deployed position. In one example, the plurality of activation conditions comprise at least an office mode, a conference mode, a rest mode, and/or a conversation mode. The control system 92 can be selectively activated using at least one of a voice command 96, a smart device 98, or a vehicle console with a touch display 100 or tactile button/toggle interface 102. The control system 92 can also be activated to automatically move the second panel 36 to the deployed position in response to various activation conditions.

Figure 8:
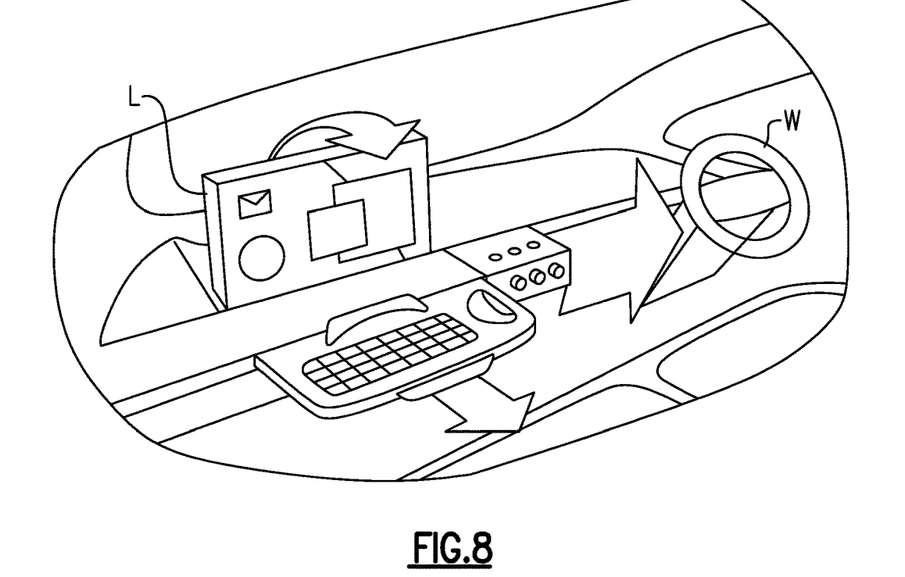
FIG. 8 shows an office vehicle condition.

An office mode can be initiated, for example, by folding or moving a steering wheel W out of the way provide a desk or work area for a laptop L as shown in FIG. 8. The privacy panel would be raised for privacy as well as to allow the occupant to focus by keeping light off laptop L and/or dash screens. An office mode can also be initiated, for example, by turning the sitting areas in the front row to face the sitting areas in the rear row to provide a conference room area for private conversations. The raised privacy panel prevents external people from seeing who is in the conference room.

In another example, the plurality of activation conditions comprise at least a changing room condition. One or more interior sensors 104 can be used to recognize the changing room condition and initiate the controller 94 to move the second panel 36 to the deployed condition. This provides privacy for people changing into and out of work clothes, for example.

In another example, the plurality of activation conditions comprise a security mode that is automatically activated once a vehicle 10 with the first 32 and second 36 panels is parked and unoccupied. Interior sensors 104 can determine when the vehicle is unoccupied and the privacy second panel 36 can then be raised when the vehicle 10 is not in use. Closing the privacy panels on a work truck, for example, is beneficial for security purposes as trucks may be left on a work site overnight. The privacy panels cut down on what can be seen in the truck as well as providing a much higher level of physical security.

Additionally, when the second panel 36 is in the deployed position, one or more exterior sensors 106, e.g. cameras, radar, sonar, etc., are used to alert an occupant in the passenger compartment 24 that an external person or object is approaching the passenger compartment 24. Alerting the occupant inside the vehicle 10 can be done by using either a smart device or an internal touch screen showing an outside camera view and/or while providing an audible chiming noise. An exterior camera can be used to recognize pre-screened or previously identified associates such that the privacy panel 36 can be lowered when they approach the vehicle 10.

Exterior 108 and interior 110 sound exciters can be used to create an intercom such that an occupant within the passenger compartment 24 can communicate with someone external to the passenger compartment while in the privacy mode without losing heat and or cooling air from within the passenger compartment. Additionally, the exterior sound exciter 108 can be used to recognize a knock on the panel such that the privacy panel can then be dropped or slightly lowered to allow verbal communication.

Figure 9:
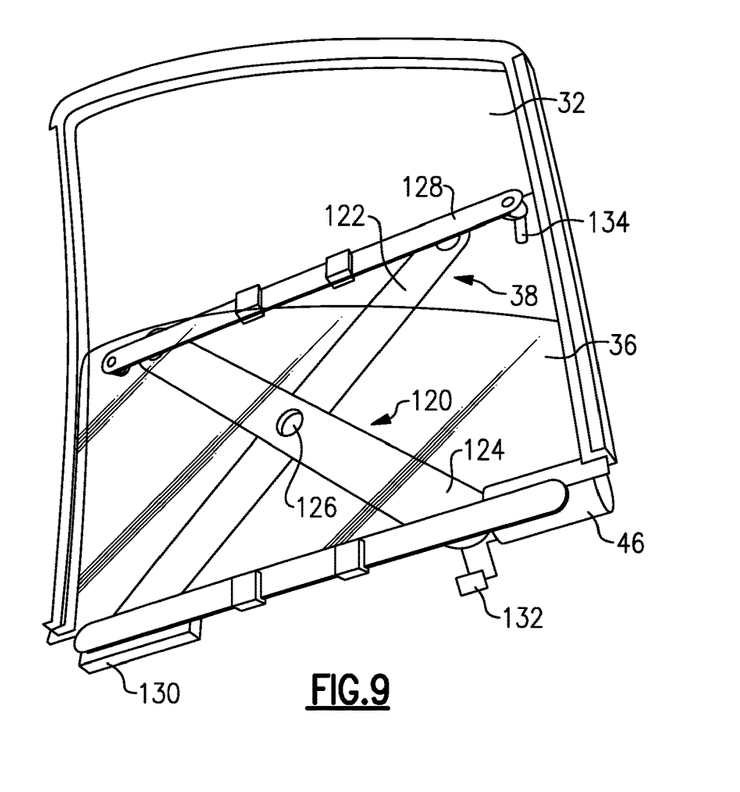
FIG. 9 shows another embodiment of a dual pane window and mechanical drive system.

In another example shown in FIG. 9, the drive mechanism 38 comprises a scissors system 120 that is driven by the motor 46. The scissors system 120 includes first 122 and second 124 arms that are connected to each other at a pivot 126. The first arm 122 has one end connected to a first support bar 128 mounted to a bottom edge of the first panel 32 and an opposite end connected to a track 130 that is held fixed within the door frame structure 34. The second arm 124 has one end connected to the first bar 128 and a second end that is driven by the motor 46 via a drive gear shown schematically at 132. The drive gear 132 is driven by the motor 46 in one direction to pivot the second arm 124 causing the first and second arms to move together to pull the first panel 32 downward to the open position. The drive gear 132 is driven by the motor 46 in an opposite direction to pivot the second arm 124 causing the first and second arms to move apart from each other to push the first panel 32 upward to the closed position. The end of the first arm 122 slides back and forth within the track 130 as the first panel 32 is raised and lowered.

Figure 10A:
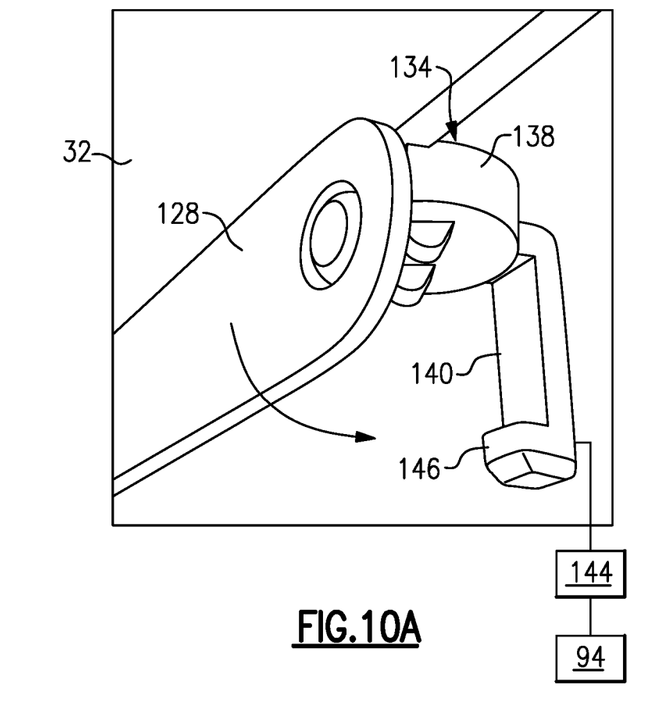
FIG. 10A shows a coupler for the embodiment of FIG. 9 in a single pane condition.
Figure 10B:
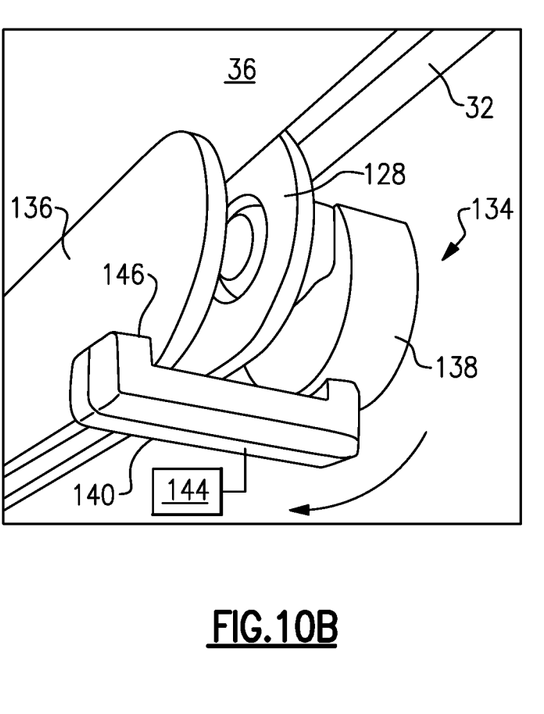
FIG. 10B shows the coupler for the embodiment of FIG. 9 in a dual pane condition.
Figure 11:
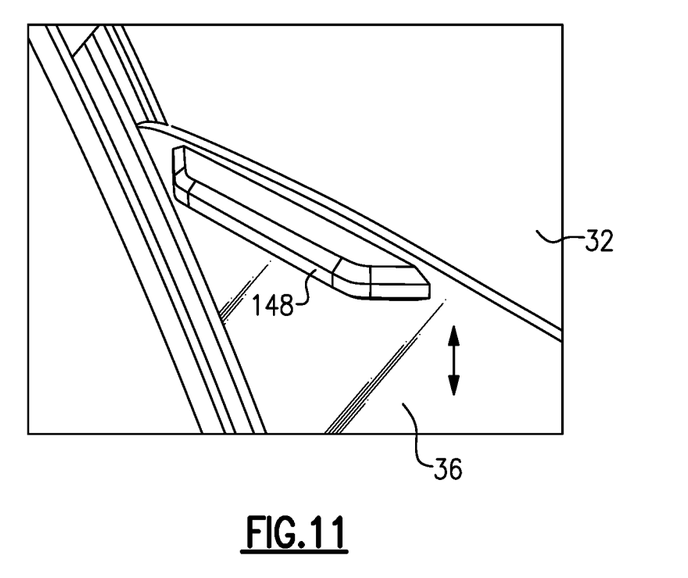
FIG. 11 shows a handle on the privacy panel for manual actuation.

In one example, a coupler 134 is mounted to the first bar 128 to selectively couple the first bar 128 to a second bar 136 that is mounted along a bottom edge of the second panel 36. As shown in FIGS. 10A and 10B, the coupler 134 comprises a base member 138 that is fixed to the first bar 128 and a pivot arm 140 that can be used to grab the second bar 136. When the privacy mode is not activated, the pivot arm 140 extends vertically downward from the base member 138 such that there is no contact between the pivot arm 140 and the second bar 136 as the first panel 32 moves between the open and closed positions. When the privacy mode is activated, the first panel 32 is moved to the lowered, open position and an actuator 144 moves the pivot arm 140 such that it extends in a lateral direction underneath the second bar 136. In one example, the actuator 144 comprises a linear actuator, such as a solenoid, which is controlled by the controller 94 to move the pivot arm 140 to a pivoted position; however, other types of actuators could also be used. The pivot arm 140 includes a lip 146 at the distal end of the arm 140 that extends in an upward direction when the arm 140 is in the pivoted position. When the motor 46 is activated to drive the drive gear 132 to raise the first panel 32, the pivot arm 140 grabs the second bar 136 such that the first 32 and second 36 panels are moved upwardly together to the privacy position. Optionally, a handle 148 could be attached to an edge of the second panel 36 to manually lift and lower the second panel 36 as shown in FIG. 11.

Figure 12:
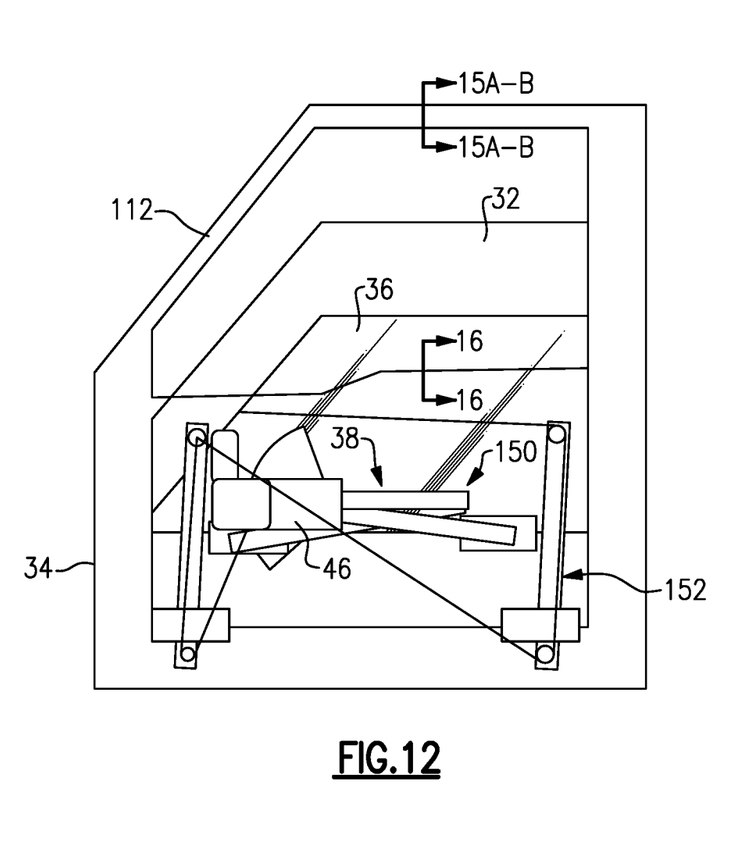
FIG. 12 shows another embodiment of a dual pane window and mechanical drive system.
Figure 13:
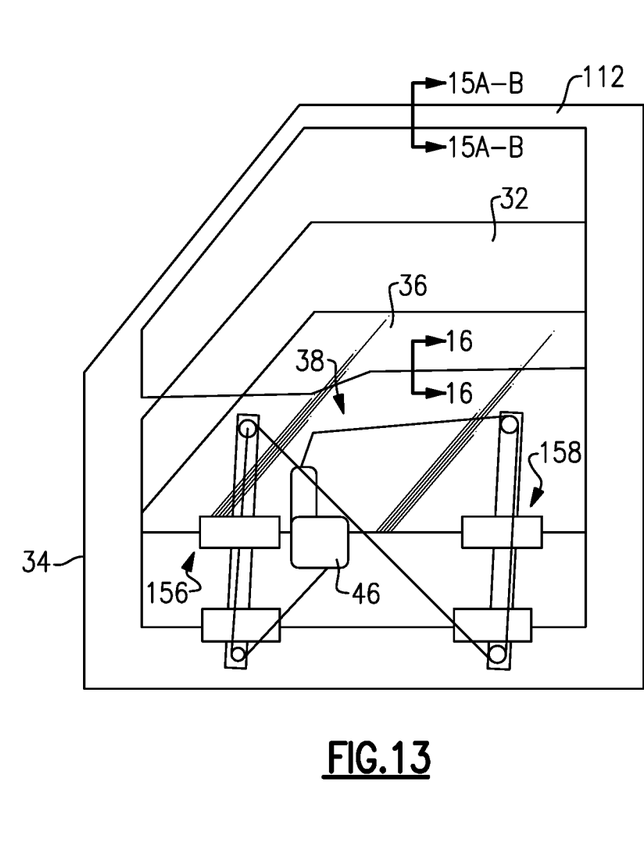
FIG. 13 shows another embodiment of a dual pane window and mechanical drive system.

FIG. 12 shows another example of a drive mechanism 38 wherein the first panel 32 is driven by a scissor mechanism 150 and the second panel 36 is driven by a cable mechanism 152. FIG. 13 shows another example of a drive mechanism 38 wherein the first panel 32 is driven by a first cable mechanism 156 and the second panel 36 is driven by a second cable mechanism 158.

Figure 14:
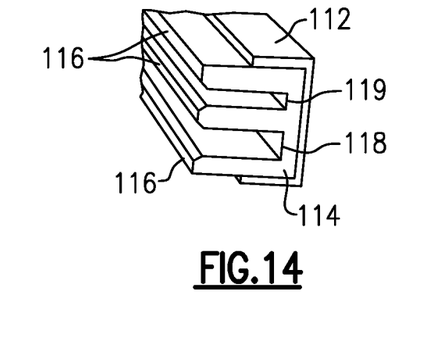
FIG. 14 is a perspective view of a guide channel that guides outer edges of the first and second panels.

In one example, the first 32 and second 36 panels are movable within an upper window frame 112 that is fixed to the door frame structure 34. The upper window frame 112 can comprise a U-shaped channel that receives a guide channel 114 as shown in FIG. 14. In one example, the guide channel 114 has three prongs 116 that are separated from each other to define a first channel 118 and a second channel 119. The first panel 32 slides within the first channel 118 and the second panel 36 slides within the second channel 119. This provides for smooth up and down movement for the panels and prevents scratching.

Figure 15A:
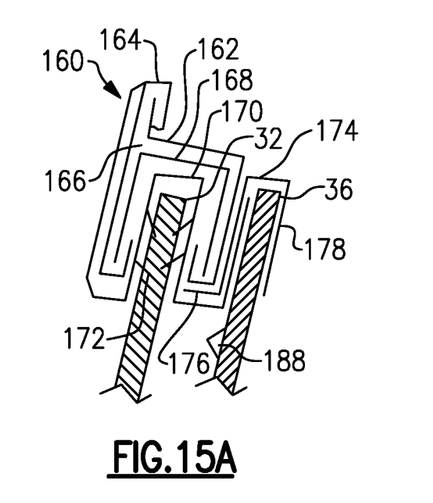
FIG. 15A is an example of the first and second panels as received within an upper window frame edge.

FIG. 15A shows an example of an upper door edge 160 which comprises portions of a door inner panel 162 and a door outer panel 164 that are spaced apart from each other to provide an upper channel 166. A glass channel 168 is received within the upper channel 166 and a glass run 170 with a shed lip 172 is received with the glass channel 168. An upper edge of the first panel 32 slides into and out of the glass run 170. A clip 174 has one arm 176 that clips over the door inner panel 162 and the glass channel 168. The clip 174 includes a second arm 178 that is bent into a U-shape against the door inner panel 162 to provide a channel that receives the upper edge of the second panel 36 when in the deployed positions.

Figure 15B:
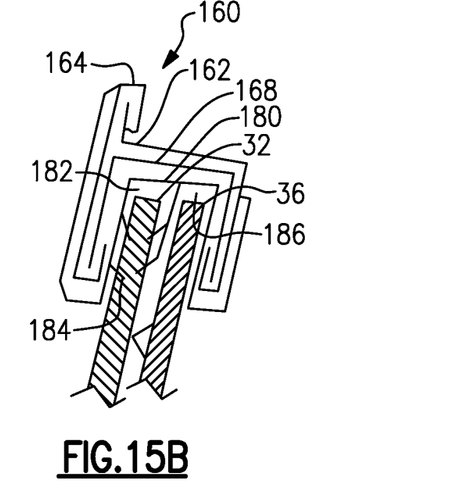
FIG. 15B is another example of the first and second panels as received within an upper window frame edge.

In an alternate arrangement shown in FIG. 15B, a guide channel 180, similar to that of guide channel 114 described above, is received within the glass channel 168. There are three prongs that are spaced apart from each other to form a glass run channel 182 with a shed lip 184 that receives the first panel 32 and a second channel 186 that receives the second panel 36.

In the FIG. 15A configuration there is a larger gap between the first 32 and second 36 panels versus the FIG. 15B configuration. This allows a base door frame structure to be used.

In one example, an aligner feature 188 is located on the second panel 36 to provide a low-contact and low-friction interface as the second panel 36 moves between the deployed and non-deployed positions.

Figure 16:
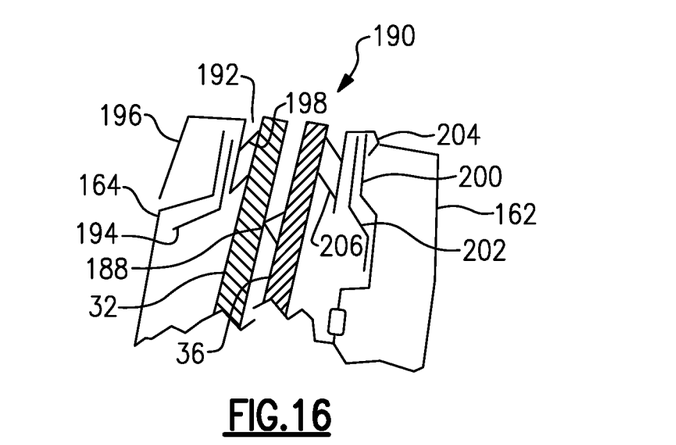
FIG. 16 is an example of the first and second panels as received within a lower window frame edge.

FIG. 16 shows an example of a lower door edge 190 which comprises other portions of the door inner panel 162 and the door outer panel 164 that are spaced apart from each other to provide a lower channel 192. An outer reinforcement portion 194 is positioned adjacent the door outer panel 164 and an outer member 196 extends over the outer reinforcement portion 194 and the door outer panel 164. A shed lip 198 is on the outer member 196 that faces the first panel 32. An additional door inner portion 200 is positioned inward of the door inner panel 162 and an inner reinforcement portion 202 is positioned inward of the additional door inner portion 200. An inner member 204 extends over the inner reinforcement portion 202 and the additional door inner portion 200. A shed lip 206 is on the inner member 204 that faces the second panel 36.

The subject disclosure provides a mechanical solution to provide increased privacy within an interior vehicle space. This mechanical solution is less expensive than chemical, transparent display, and electrically activated glass configurations that have been previously used. Due to this savings, this technology can be provided in a mass market format.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A system comprising:
   a first panel configured to be movably mounted within a vehicle structure to move between an open position and a closed position, wherein the vehicle structure comprises an upper window frame that is fixed to a door frame structure, and wherein the upper window frame comprises a U-shaped channel;
   a second panel moveable independently of the first panel within the vehicle structure by a drive mechanism between a deployed position and a non-deployed position, wherein the first panel is non-opaque and the second panel is opaque, and wherein the second panel automatically or selectively moves to the deployed position to provide a privacy mode within a passenger compartment;
   a guide channel received within the U-shaped channel of the upper window frame and including a plurality of prongs to provide a first channel for the first panel and second channel for the second panel;
   a control system configured to control the drive mechanism to selectively or automatically move the second panel within the second channel to the deployed position in response to at least one of a plurality of activation conditions; and
   wherein the drive mechanism comprises at least one drive motor that associated with:
      a scissor system comprising a first arm and a second arm that are connected to each other at a pivot, and including a first bar mounted to a bottom edge of the first panel, a second bar mounted along a bottom edge of the second panel, and a coupler mounted to the first bar to selectively couple the first bar to the second bar; or
      a pulley/cable system comprising a center spine that is centrally located within the door frame structure, wherein the center spine includes both a first track formed on one side that slidably receives the first panel and a second track formed on an opposite side that slidably receives the second panel.

2. The system of claim 1, wherein the first panel comprises a glass window and the second panel is comprised of a polycarbonate or metal material.

3. The system of claim 1, wherein the second panel has an exterior surface with one or both of a pattern and a logo.

4. The system of claim 1, wherein the second panel has an exterior surface that comprises a one-way mirror.

5. The system of claim 1, wherein the second panel has an exterior surface that matches a body color of a vehicle that provides the passenger compartment.

6. The system of claim 1, wherein the drive mechanism is the scissor system, and wherein the first arm has one end connected to the first bar and an opposite end connected to a track, and wherein the second arm has one end connected to the first bar and an opposite end that is driven by the at least one drive motor.

7. The system of claim 1, wherein the drive mechanism comprises the pulley/cable system, and wherein the first panel includes a first cartridge that slides within the first track and the second panel includes a second cartridge that slides within the second track, and wherein the pulley/cable system includes a first set of pulleys driven by the at least one drive motor to move the first panel and a second set of pulleys driven by the at least one drive motor such that the first and second panels can move independently of each other.

8. The system of claim 7, wherein the first and second sets of pulleys include a common drive pulley, and including a clutch having a first clutch member associated with the drive pulley and a second clutch member that is associated with the second panel such that, when the first and second clutch members are engaged with each other, the first and second panels can move together as a unit.

9. The system of claim 1, wherein the plurality of activation conditions comprise at least an office mode, a conference mode, a rest mode, or a conversation mode.

10. The system of claim 1, wherein the control system is activated using at least one of a voice command, a smart device, or a vehicle console with a touch display or a tactile button, or a toggle interface.

11. The system of claim 1, wherein, when the second panel is in the deployed position, one or more exterior sensors are used to alert an occupant in the passenger compartment that an external person or object is approaching the passenger compartment.

12. The system of claim 11, wherein exterior and interior sound exciters are used to create an intercom such that an occupant within the passenger compartment can communicate with someone external to the passenger compartment.

13. The system of claim 1, wherein the door frame structure is associated with a vehicle, and wherein the plurality of activation conditions comprise at least a changing room condition, and including at least one interior sensor within the vehicle that is used to recognize the changing room condition and initiate the control system to move the second panel to the deployed position.

14. The system of claim 1, wherein the plurality of activation conditions comprise a security mode that is automatically activated once a vehicle with the first and second panels is parked and unoccupied.

15. A method comprising:
mounting a first panel within a vehicle door structure to move between an open position and a closed position, wherein the vehicle door structure comprises an upper window frame that is fixed to a door frame structure, and wherein the upper window frame comprises a U-shaped channel;
mounting a second panel within the vehicle door structure to move independently of the first panel between a deployed position and a non-deployed position;
receiving a guide channel within the U-shaped channel of the upper window frame, the guide channel having a plurality of prongs to provide a first channel for the first panel and second channel for the second panel; and
automatically or selectively moving the second panel in the second channel to the deployed position using a drive mechanism to provide a privacy mode within a passenger compartment in response to at least one of a plurality of activation conditions, wherein the drive mechanism comprises at least one drive motor that is associated with:
a scissor system comprising a first arm and a second arm that are connected to each other at a pivot, and including a first bar mounted to a bottom edge of the first panel, a second bar mounted along a bottom edge of the second panel, and a coupler mounted to the first bar to selectively couple the first bar to the second bar; or
a pulley/cable system comprising a center spine that is centrally located within the door frame structure, wherein the center spine includes both a first track formed on one side that slidably receives the first panel and a second track formed on an opposite side that slidably receives the second panel.

16. The method of claim 15, wherein:
the first panel is non-opaque and the second panel is opaque, or the first panel comprises a glass window and the second panel is comprised of a polycarbonate or metal material; and
coupling one of the pulley/cable system or the scissor system to independently move the first and second panels using a drive motor.

17. The method of claim 15, including selectively coupling the first panel for movement with the second panel such that the first panel and the second panel are coupled together to simultaneously move to the deployed position and closed position within the respective first and second channels.

18. The method of claim 15, including forming the first and second channels to be separate channels spaced apart from each other by at least one prong of the plurality of prongs, and including providing the guide channel to extend along at least an uppermost portion of the upper window frame.

19. The method of claim 15, including providing an aligner mounted on the second panel to move with the second panel and provide a low-contact and low-friction interface as the second panel moves between the deployed and non-deployed positions.

20. The system of claim 1, wherein the drive mechanism comprises the scissor system and the coupler selectively couples the first panel and the second panel together, and wherein the control system is configured to selectively control the coupler to couple the first panel to the second panel together to simultaneously move the first panel to the closed position and the second panel to the deployed position within the respective first and second channels.

21. The system of claim 1, wherein the first and second channels comprise separate channels that are spaced apart from each other by at least one prong of the plurality of prongs, and wherein the guide channel extends along at least an uppermost portion of the upper window frame.

22. The system of claim 1, including an aligner mounted on the second panel, wherein the aligner moves with the second panel and comprises a low-friction interface as the second panel moves between the deployed and non-deployed positions.

23. The system of claim 6, wherein the opposite end of the second arm is driven by the at least one drive motor via a drive gear and the opposite end of the first arm slides back and forth within the track as the first panel is raised and lowered.

24. The system of claim 1, wherein the drive mechanism comprises the pulley/cable system, and wherein the first panel includes a first panel bar that extends along a lower edge of the first panel and the second panel includes a second panel bar that extends along a lower edge of the second panel, and wherein a first cartridge is mounted to the first panel bar to slide along the first track and a second cartridge is mounted to the second panel bar to slide along the second track.

25. The system of claim 24, wherein the first panel bar has opposing ends that are mounted to the first panel and a first portion of the first panel bar is spaced from the first panel to provide an open area between the first panel bar and the first panel for the first cartridge, and wherein the second panel bar has opposing ends that are mounted to the second panel and a second portion of the second panel bar is spaced from the second panel to provide an open area between the second panel bar and the second panel for the second cartridge.

26. The method of claim 15, wherein the drive mechanism is the scissor system, and including connecting one end of the first arm to the first bar and an opposite end to a track, and connecting one end the second arm to the first bar and driving an opposite end with the at least one drive motor.

27. The method of claim 26, including driving the opposite end of the second arm with the at least one drive motor via a drive gear while the opposite end of the first arm slides back and forth within the track as the first panel is raised and lowered.

28. The method of claim 15, wherein the drive mechanism comprises the pulley/cable system, and including extending a first panel bar along a lower edge of the first panel and extending a second panel bar along a lower edge of the second panel, and including mounting a first cartridge to the first panel bar to slide along the first track and mounting a second cartridge to the second panel bar to slide along the second track.

29. The method of claim 28, including mounting opposing ends of the first panel bar to the first panel and spacing a first portion of the first panel bar from the first panel to provide an open area between the first panel bar and the first panel for the first cartridge, and including mounting opposing ends of the second panel bar to the second panel and spacing a second portion of the second panel bar from the second panel to provide an open area between the second panel bar and the second panel for the second cartridge.

* * * * *